Dec. 27, 1949 — L. K. KNIGHT — 2,492,872
MATERIAL REDUCING APPARATUS HAVING A SHIFTABLE FEED MEANS
Filed June 9, 1945 — 2 Sheets-Sheet 1

INVENTOR:
LLOYD K. KNIGHT,
BY Harker H. Hittson,
ATTY.

Dec. 27, 1949 L. K. KNIGHT 2,492,872
MATERIAL REDUCING APPARATUS HAVING
A SHIFTABLE FEED MEANS
Filed June 9, 1945 2 Sheets-Sheet 2
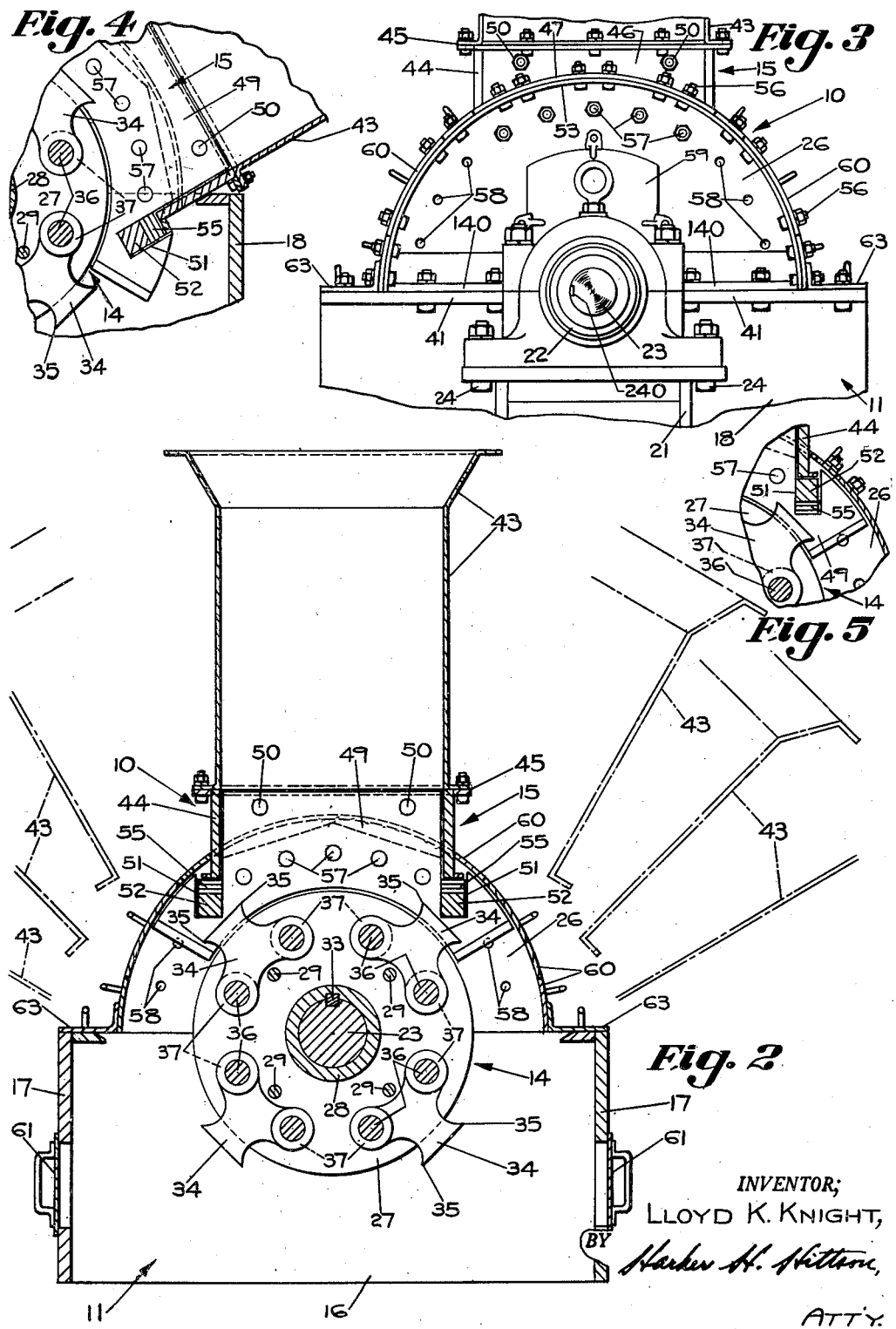
INVENTOR;
LLOYD K. KNIGHT,
BY Harker H. Hittson,
ATTY.

Patented Dec. 27, 1949

2,492,872

UNITED STATES PATENT OFFICE 2,492,872

MATERIAL REDUCING APPARATUS HAVING A SHIFTABLE FEED MEANS

Lloyd K. Knight, Westerville, Ohio, assignor, by mesne assignments, to The Jeffrey Manufacturing Company, a corporation of Ohio Application June 9, 1945, Serial No. 598,607

3 Claims. (Cl. 241—186)

This invention relates to a shredder or material reducing apparatus and more particularly to a material reducing apparatus wherein material to be reduced is fed to a rotating reducing element by means of an adjustable conveyor.

An object of the invention is to provide a shredder or material reducing apparatus which includes a material reducing rotor and a conveyor or feed chute for conveying material thereto that is adjustable arcuately with respect to the axis of the material reducing rotor.

In carrying out the foregoing object, it is a further object of the invention to provide a shredder or material reducing apparatus that includes a material reducing rotor and a housing therefor and to provide a material conveyor or feed chute that is adjustable with respect to the housing and the rotor for conveying material in a generally radial direction to the periphery of the rotor at variable angles.

It is another object of the invention to provide a shredder or material reducing apparatus which includes a material reducing rotor and a conveyor or chute for conveying material generally radially thereto in which the conveyor is swingable about the axis of the rotor and which carries one or more breaker bars which cooperate with the rotor to reduce material that is being fed into the apparatus in the conveyor.

It is still another object of the invention to provide a shredder or material reducing apparatus that includes a material reducing rotor and a conveyor or feed chute for conveying material to the rotor that cooperates therewith to reduce the material and in which the direction of rotation of the material reducing rotor may be reversed whereby reduced operating efficiency of the machine caused by wear of the reducing elements of the rotor and conveyor may be restored by reversing the direction of rotation of the rotor.

Other and further objects and advantages of the invention will be apparent from the following description, reference being had to the accompanying drawings wherein a preferred embodiment of the invention is clearly shown.

In the drawings:

Fig. 2 is a view in section, the section being taken on line 2—2 of Fig. 1 and looking in the direction of the arrows;

Fig. 3 is an end view in elevation of a portion of the material reducing apparatus as seen when viewed from the right side of Fig. 1, the fly wheel on the end of the rotor shaft being removed for the sake of clarity;

Fig. 4 is a view in section of a fragment of the material reducing apparatus, the view showing portions of a material conveyor or chute and the housing of the apparatus in a different position; and Fig. 5 is a view in section of a fragment of the apparatus seen in Fig. 2, but with the conveyor or chute in the position shown in Fig. 1 and with its material reducing elements in a different position.

Figure 1:
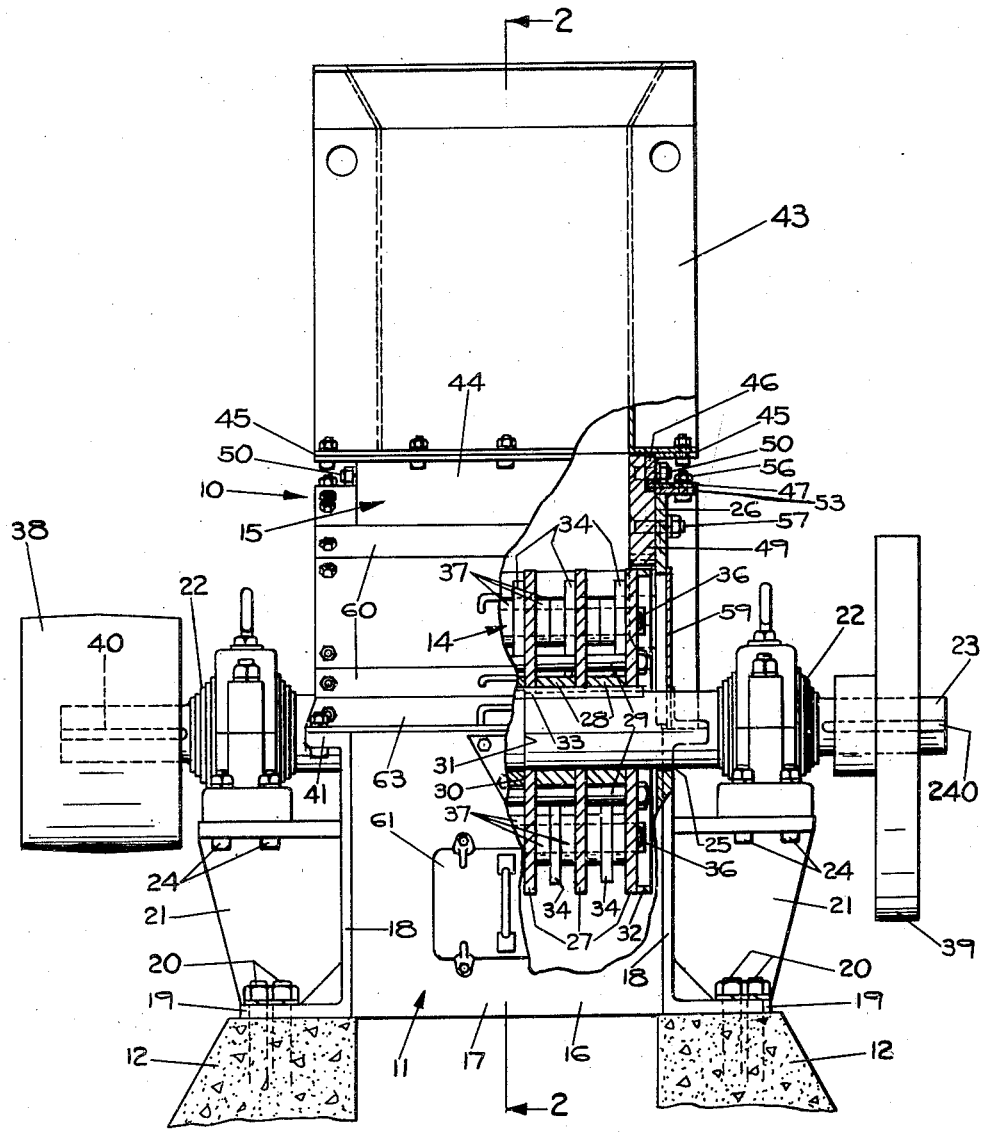
Fig. 1 is a side view in elevation of a shredder or material reducing apparatus that embodies the invention, but having a portion thereof broken away to show details of its internal structure.

My invention is shown in the drawings as being embodied in a material reducing apparatus that is generally known as a shredder or bale breaker. Bale breakers, as the name implies, are particularly adapted to reduce or disintegrate baled material and such bale breakers are used, for example, in the making of paper for reducing or disintegrating bales of hemp prior to the digestion thereof in order to render the hemp more readily digestible. The digesting process referred to is well known in the paper making art. The invention, however, may be embodied with equal advantage and facility in material reducing devices that include material reducing rotors that are used for reducing substantially any material whether the material be friable or non-friable in character.

Referring to the drawings and in particular to Fig. 1 thereof, a material reducing apparatus 10 in the form of a bale breaker or shredder is shown. The bale breaker 10 includes a generally semi-cylindrical housing or casing 11 which is supported upon and secured to a foundation 12, a material reducing cylinder or rotor 14 that is contained within the housing or casing 11 and concentric therewith, and a material conveyor or chute 15 that is adjustably secured to the housing or casing while extending radially therefrom, and is adapted to convey material to be reduced generally radially to the periphery of the rotor 14.

The housing or casing 11 includes a bottom portion or base 16 that may be a casting but which is shown in the drawings as being of welded construction including side plates 17 and end plates 18. Feet 19 that support the reducing apparatus are integral with the end plates 18 and extend outwardly and are secured to the foundation 12 by bolts 20. A rotor bearing support 21 is also formed as a part of each end plate 18 and each support 21 forms a gusset between the end plate 18 and its foot 19. Self-aligning bearings 22 that receive the shaft 23 of the rotor 14 are secured to the supports 21 by bolts 24 and said rotor shaft 23 extends between the bearings 22, across the base and supports the rotor 14 between the end plates or walls 18 which are notched at 25 (see Fig. 1) to receive the shaft. The base portion 16 of the housing supports a pair of upright arcuate or semi-circular end walls or plates 26, the inside surfaces of which are in vertical alignment with the inside surfaces of the end plates 18 of the base portion 16.

The rotor body is a composite structure that is assembled on the shaft 23 and includes discs 27, tubular spacers 28 and tie bolts 29. The diameter of the rotor shaft is greatest at its center to provide a pair of similar shoulders one of which is seen at 31 against which the discs 27 that are adjacent the center of the rotor abut to secure the rotor body 14 against sidewise movement on the rotor shaft 23. The center spacer 28 is of such internal diameter as to be received by the large center portion of the rotor shaft and of such length that its ends 30 form continuations of the shoulders 31 and abut the inside surfaces of the central discs 27. The discs 27 and spacers 28 are placed alternately upon the rotor shaft 23 and the tie bolts 29 extend from side to side of the rotor assembly through aligned openings in the discs 27 and clamp the discs and spacers together and against the shoulders 31 of the shaft and the ends 30 of the center spacer 28. The discs 27 at the end of the rotor assembly are provided with outwardly extending flanges 32 which function to prevent tangling of material about the rotor adjacent the walls 18 of the housing. The rotor body is secured against rotation relative to the rotor shaft 23 by a key 33 that is embedded in the rotor shaft and engages each disc 27 and spacer 28 in a keyway that is formed therein. The key 33 secures the rotor assembly to the shaft and prevents shifting of any of the rotor elements with respect to one another.

The rotor 14 carries a plurality of material reducing elements, hammers or knives 34 that are positioned between the discs 27 and extend outwardly beyond the periphery of the rotor body. These material reducing elements may be of any desired shape and may be secured to the rotor assembly in any well known manner. However, it is preferable in bale breakers that the reducing elements be non-pivotally connected to the rotor and that the elements be shaped to cut or tear the baled material in reducing it. To this end the reducing elements 34 are shaped to include material cutting or tearing edges 35 and each is secured to the rotor by pins 36 that extend through the discs 27. Each of the reducing elements 34 is secured by two of the pins 36 and the elements, as viewed in Fig. 2, are placed on the rotor in rows. It has been found desirable to form the reducing elements 34 of material whose thickness is approximately one-third the width of the space between the discs 27 and to provide washers or spacers 37 for spacing the reducing elements relative to the discs. It has also been found desirable to arrange the material reducing elements 34 on the rotor so that during operation of the machine only a few of the reducing elements 34 act upon the baled material at any given time, thus reducing the power required to drive the rotor. To this end it is desirable that the reducing elements 34 of the adjacent rows of elements seen in Fig. 2 be spaced relative to one another so that they form a helix about the periphery of the rotor 14.

From the foregoing description it will be seen that the portion of the reducing apparatus thus far described includes a substantially hollow rectangular base portion 16 and a pair of arcuate end walls or plates 26 that extend upwardly above the end plates 18 of the base portion 16 and that the inside surfaces of the arcuate walls 26 lie in the same vertical planes as the inside surfaces of the end plates 18. It will also be seen that the complete rotor assembly 14 is carried between the ends of the housing 11 with its shaft extending through the end walls of the housing and the bearings 22.

The rotor shaft 23 is secured to the hubs of the bearings 22 to retain the complete rotor assembly centered within the housing and the shaft is provided with a suitable pulley 38 by which it may be driven from a motor through a belt, for example. The end of the rotor shaft 23 opposite the pulley 38 carries a fly wheel 39 and both the pulley and fly wheel are secured to the shaft by keys 40 and 240, respectively.

The arcuate end plates 26 are provided with outwardly extending flanges 140 on their bases that mate with and are bolted to flanges 41 of the end walls 18 of the base.

The conveyor or chute 15 includes a loading section 43 and a feed section 44 that are bolted together at 45. The feed section 44 of the conveyor is of rugged welded construction and includes end walls or plates 46 that are shaped to conform to the contour of the arcuate plates 26 and carry outwardly extending flanges 47. The inside of each of the end walls 46 of the feed section has a relatively heavy plate or liner 49 that is secured thereto by a pair of bolts 50. The plates 49 extend from the feed section 44 and are received between the arcuate end walls 26 when the conveyor is attached to the housing. The plates 49 are notched or cut out at 51 to form sockets that receive reducing elements or bars 52 which form an adjustable part of the conveyor. The reducing elements 52 cooperate with the rotor for reducing material that is fed into the reducing apparatus through the conveyor 15. The reducing elements or bars 52 are adapted to cooperate with the rotor to reduce material that is fed into the apparatus through the conveyor and the bars are positioned with respect to the periphery thereof by means of spacer elements 55 which may be placed to position the element in the positions shown in Figs. 4 or 5 and in any position intermediate thereof. It is desirable that those spacers 55 that are above the breaker bars 52 be of the same length as the breaker bars in order that there will be no gap between the breaker bars 52 and the bottom of the feed section wall and that those spacers 55 below the breaker elements be of such length that they will lie entirely within the sockets 51.

An important feature of my invention resides in the adjustability of the pivoted or swingable conveyor or chute 15 with respect to the housing 11 and the material reducing rotor 14. The conveyor or chute assembly 15 when positioned upon the housing 11 is supported by arcuate flanges 53 that receive the flanges 47 of the feed section 44 and the plates 49 form spice plates between the end walls 46 of the feed section and the arcuate walls 26 of the housing. The flanges 53 and 47 are secured together by bolts 56 and the plates 49 are secured to the arcuate end walls by bolts 57. With the bolts 56 and 57 removed the conveyor or chute 15 may be removed bodily from the housing to adjust the breaker elements 52 or it may be moved arcuately with respect to the housing about the axis of the rotor while maintaining its radial characteristic. The bolts 57 may be placed, when the chute 15 is correctly positioned, in any of the openings 58 in the arcuate end walls 26 and the bolts 56 may be placed in properly spaced openings that are formed in the flanges 53 of the end walls 26. The conveyor 15 may be moved or adjusted to any of various positions shown and indicated in Figs. 2 and 4, in all of which the distance between the breaker bars 52 and the rotor 14 is the same due to the concentric structure of rotor 14 and end plates 26.

The housing or casing 11 is provided with a plurality of inspection doors 61 (see Fig. 2) to permit ready access to its interior. Inspection and service doors 59 (see Fig. 3) are also provided for covering openings in the arcuate end plates 26 to permit access to the ends of the rotor 14 and to permit the removal of the pins 36 in order that the reducing elements can be readily removed and replaced without the necessity of disassembling the housing 11.

It is desirable that the casing or housing 11 be closed, except for its material inlet and outlet openings. In order that the areas at each side of the chute 15 and between the arcuate side walls 26 may be covered and uncovered to permit ready adjustment of the chute 15 on the arcuate walls 26, sectional cover members that are formed by plates 60 are provided. The plates 60 are shaped to conform with the shape of the arcuate walls 26 and are received by the flanges 53 thereof to which they are bolted. When it is desired to adjust the chute 15 with respect to the arcuate walls 26, the plates 60 are removed as necessary to uncover the area to which the chute 15 is to be moved and after the chute has been adjusted to its new position the plates 60 which were removed are bolted to the arcuate walls 26 to cover the area that was formerly occupied by the chute 15.

The conveyor or chute 15 may be supported by the arcuate walls 26 so as to occupy any one of the various positions illustrated in Figs. 2 and 4 of the drawings. However, when the chute is adjusted to the position seen in Fig. 4 it is necessary to remove, in addition to the necessary cover plates 60, one of a pair of cover members 63 that extend across and cover the top of the bottom portion 16 of the housing 11 at the sides of the arcuate walls or plates 26.

The material reducing rotor 14 may be operated in either direction, that is, it may be rotated clockwise or counter-clockwise for reducing material fed thereto by the conveyor 15. The breaker bars or breaker elements 52 are attached to and swing with the chute 15. They can be positioned to adjust the clearance between them and the conveyor 15, as is shown in the drawings, or they can be removed by sliding the bars 52 endwise when the conveyor 15 is removed from the housing 11.

In the operation of the reducing apparatus, bales of hemp or like material are fed through material confining chute 15 into the reducing chamber of the apparatus and first engage the periphery of the material reducing rotor assembly 14 by reason of their weight. I have found that by varying the angle of the conveyor with respect to a horizontal plane taken through the axis of the rotor that the conveyor will act frictionally upon the bales being fed to retard or slow down their feed rate as desired, thus to control the rate at which material will be removed from the bale by the reducing elements 34 of the rotor. I have also found that the particles of material that are removed from the bales will be further reduced in size when the breaker elements 52 are positioned as shown in Figs. 2 and 4 of the drawings. The breaker elements or bars 52 are moved away from the rotor or removed from the conveyor 15, as was previously described, when it is desired to break the bales into larger pieces.

The rotor assembly 14 may be rotated, for example, in a clockwise direction for reducing material and when the wear on the reducing elements 34 and 52 has become such as to interfere with the proper reduction of the material, the direction of rotation of the rotor may be reversed and the edges which were previously the trailing edges of the rotor reducing elements 33 then become the leading edges and the breaker bar on the left side of the machine which has not been worn will cooperate with the sharp edges of the elements 33 to correctly reduce the material. It is to be understood, however, that when all of the elements 34 and 52 have become worn it will be necessary to renew them. However, by providing a reversible machine I have found that the expense connected with the maintenance of the device is greatly reduced since one set of elements 33 can be utilized, merely by reversing the direction of rotation of the rotor, to wear out two breaker elements 52 without the necessity of servicing the material reducing apparatus.

While the invention has been described in connection with a bale breaker it is to be understood that it may be used in any reducing apparatus wherein the reduction of material is accomplished by a rotating reducing element and that the material reducing elements on the rotor, particularly when friable material is to be reduced, may be of the swing hammer type.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent in the United States is:

1. In a reducing apparatus, a material reducing rotor, a generally semi-cylindrical housing for said rotor including arcuate end walls adjacent the ends of said rotor one on each side thereof and concentric therewith, a chute for conveying material to said rotor adjustably associated with said housing and supported between said end walls while extending substantially radially therefrom, and cover means for said rotor supported on opposite ends by said arcuate end walls at the sides of said chute, said cover means being shiftable to permit arcuate adjustment of said material conveyor while maintaining its radial characteristic.

2. In a reducing apparatus, a material reducing rotor, means supporting said rotor, arcuate walls adjacent the ends of said rotor and concentric therewith, and a chute for conveying material to said rotor extending radially therefrom and including oppositely disposed movable reducing elements adapted to cooperate with said rotor for reducing said material, said chute being supported by and movable with respect to said arcuate end walls and movable about the axis of said rotor while maintaining its radial characteristic.

3. In a reducing apparatus, a material reducing rotor, means supporting said rotor, arcuate walls adjacent the ends of said rotor and concentric therewith, and a chute for conveying material to said rotor extending radially therefrom and including a movable reducing element adapted to cooperate with said rotor for reducing said material, said chute being supported by and movable with respect to said arcuate end walls and movable about the axis of said rotor while maintaining its radial characteristic.

LLOYD K. KNIGHT.

REFERENCES CITED

The following references are of record in the file of this patent:

UNITED STATES PATENTS

| Number | Name | Date |
|---|---|---|
| 242,387 | Smith | Mar. 31, 1881 |
| 838,370 | Belt et al. | Dec. 11, 1906 |
| 1,121,454 | Baster | Dec. 15, 1914 |
| 1,558,302 | Smartt | Oct. 20, 1925 |
| 1,728,843 | Trunz | Sept. 17, 1929 |
| 1,748,046 | Bullock | Feb. 18, 1930 |
| 2,271,175 | Mantelet | Jan. 27, 1942 |
| 2,292,852 | Werner | Aug. 11, 1942 |
| 2,348,916 | Magnus | May 16, 1944 |
| 2,398,932 | Grant | Apr. 23, 1946 |

FOREIGN PATENTS

| Number | Country | Date |
|---|---|---|
| 41,438 | Denmark | Dec. 28, 1929 |
| 274,897 | Germany | June 3, 1914 |